US008345047B2

(12) United States Patent
Sanchez

(10) Patent No.: US 8,345,047 B2
(45) Date of Patent: Jan. 1, 2013

(54) METHOD FOR DISPLAYING PERFORMANCE INFORMATION FOR ONE OR MORE VEHICLES

(75) Inventor: Julian Sanchez, Bettendorf, IA (US)

(73) Assignee: Deere & Company, Moline, IL (US)

( * ) Notice: Subject to any disclaimer, the term of this patent is extended or adjusted under 35 U.S.C. 154(b) by 1497 days.

(21) Appl. No.: 11/755,027

(22) Filed: May 30, 2007

(65) Prior Publication Data

US 2008/0297512 A1 Dec. 4, 2008

(51) Int. Cl.
*G06T 11/20* (2006.01)

(52) U.S. Cl. ........................................................ 345/440

(58) Field of Classification Search ........................ None
See application file for complete search history.

(56) References Cited

U.S. PATENT DOCUMENTS

| | | | | |
|---|---|---|---|---|
| 4,189,765 | A * | 2/1980 | Kotalik et al. | 700/83 |
| 5,289,369 | A * | 2/1994 | Hirshberg | 705/13 |
| 5,309,139 | A * | 5/1994 | Austin | 340/462 |
| 6,138,081 | A * | 10/2000 | Olejack et al. | 702/104 |
| 7,043,415 | B1 * | 5/2006 | Dunlavey et al. | 703/12 |
| 2003/0065600 | A1 * | 4/2003 | Terashima et al. | 705/36 |
| 2005/0021222 | A1 * | 1/2005 | Minami et al. | 701/123 |
| 2005/0074595 | A1 * | 4/2005 | Lam | 428/297.4 |
| 2006/0200358 | A1 * | 9/2006 | Ohnemus et al. | 705/1 |
| 2006/0220915 | A1 * | 10/2006 | Bauer | 340/945 |
| 2006/0250143 | A1 * | 11/2006 | Moon et al. | 324/674 |
| 2007/0032929 | A1 * | 2/2007 | Yoshioka et al. | 701/35 |
| 2007/0106453 | A1 * | 5/2007 | Yokohata et al. | 701/115 |
| 2007/0243505 | A1 * | 10/2007 | Rath et al. | 434/29 |
| 2009/0231339 | A1 * | 9/2009 | Smith et al. | 345/440 |

OTHER PUBLICATIONS

Nology, G-Dyno Plus/GPS, Mar. 2006, URL: http://web.archive.org/web/20060327000122/http://w ww.nology.com/gdynoplus.html.*

A.L. Plamer, "Development of a three-point-linkage dynamometer for tillage research", Apr. 1, 2005, Journal of Agricultural Engineering Research vol. 52.*

Seppelt, B.D. and Lee, J.D. Making adaptive cruise control (ACC) limits visible. International Journal of Human-Computer Studies 65 (2007). pp. 192-205.

Jessa, M. and Burns, C.M. Visual sensitivities of dynamic graphical displays, International Journal of Human-Computer Studies 65 (2007), pp. 206-222.

Kaminka, G.A. and Elmaliach, Y. Experiments with an Ecological Interface for Monitoring Tightly-Coordinated Robot Teams. 2006 IEEE International Conference on Robotics and Automation. pp. 200-205. May 2006. Orlando, Florida.

Ruff, H.A.; Narayanan, S. and Draper, M.H. Human Interaction with Levels of Automation and Decision-Aid Fidelity in the Supervisory Control of Multiple Simulated Unmanned Air Vehicles. Presence. vol. 11, No. 4., pp. 335-351. Aug. 2002.

(Continued)

*Primary Examiner* — James A Thompson
*Assistant Examiner* — David H Chu
(74) *Attorney, Agent, or Firm* — Yee & Associates, P.C.; Anand Gupta

(57) ABSTRACT

A method and system for displaying information related to a work vehicle comprises sensors for detecting levels associated with corresponding performance variables. An assignor assigns points in an image or graphical data representation associated with corresponding detected levels. A graphical module interconnects the points in the image to form a performance polygon indicative of a collective level of performance of the performance variables. A display is arranged for displaying the performance polygon to a user.

14 Claims, 5 Drawing Sheets

OTHER PUBLICATIONS

Kaber, D.B.; Wright, M.C. and Sheik-Nainar, M.A. Investigation of multi-model interface features for adaptive automation of a human-robot system. International Journal of Human-Computer Studies 64 (2006). pp. 527-540.

Levinthal, B. and Wickens, C.D. Supervising Two Versus Four UAVs With Imperfect Automation: A Simulation Experiment. Technical Report AHFD-05-24/MAAD-05-7. Aviation Human Factors Division Institute of Aviation, University of Illinois at Urbana-Champaign, 1 Airport Road, Savoy, Illinois 61874. Dec. 2005.

Humphrey, C.M.; Gordon, S.M. and Adams J.A. Visualization of Multiple Robots During Team Activities. Proceedings of the Human Factors and Ergonomics Society 50th Annual Meeting. pp. 651-655. 2006.

* cited by examiner

METHOD FOR DISPLAYING PERFORMANCE INFORMATION FOR ONE OR MORE VEHICLES

FIELD OF THE INVENTION

This invention relates to a method for displaying performance information for one or more machines or vehicles.

BACKGROUND OF THE INVENTION

An operator may have difficulty visually determining if a group of performance variables is compliant by looking at conventional gauges or other indicators. For example, each and every gauge in the group may need to be read serially, individually and compared to an optimum range to determine if the group of performance variables is compliant. Accordingly, there is a need for a displaying performance variables such that a user can rapidly determine whether or not the variables are collectively compliant. Further, there is need for readily, visually monitoring the relationship between the performance variables.

SUMMARY OF THE INVENTION

A method and system for displaying performance information related to a work vehicle comprises sensors for detecting levels associated with corresponding performance variables. An assignor assigns points (e.g., apex points) in a graphical data representation or image data associated with corresponding detected levels. A graphical module interconnects the points in the graphical data representation or image data to form a performance polygon indicative of a collective level of performance of the performance variables. A display is arranged for displaying the performance polygon to a user.

DESCRIPTION OF THE PREFERRED EMBODIMENT

An interacting performance variable means that the value of one performance variable may be correlated to the value of another performance variable, that the value of one performance variable may vary with changes to the value of another performance variable, that one performance variable depends on another performance variable, or that a value of one performance variable is not entirely independent from the value of another performance variable.

Figure 1:
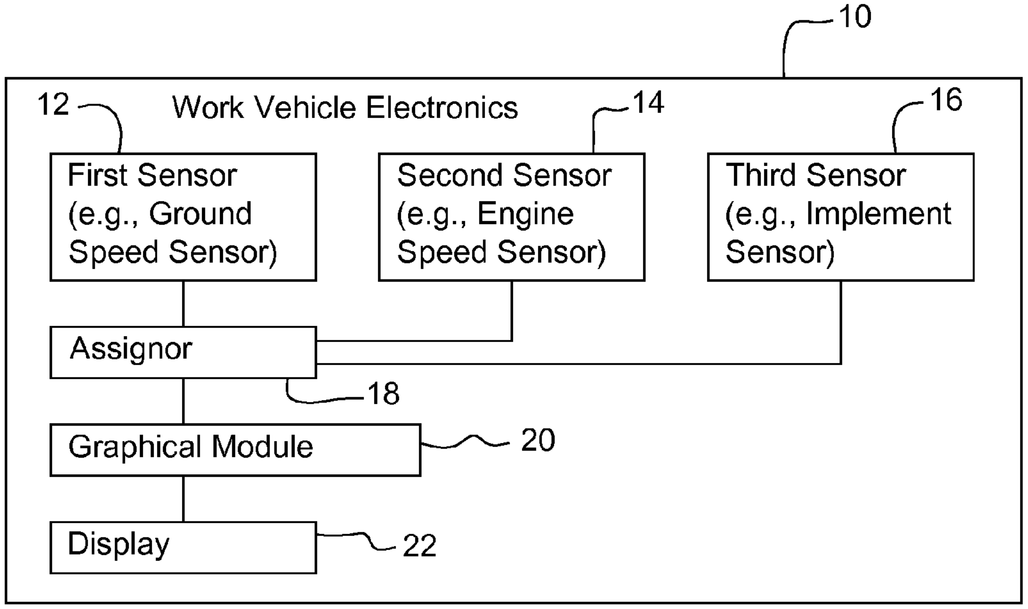
FIG. 1 is a block diagram of a first embodiment of a system for displaying performance information (e.g., interacting performance variables) related to a work vehicle.

FIG. 1 illustrates one embodiment of a system for displaying performance variables (e.g., interacting performance variables) for a vehicle or machine. The system of FIG. 1 may be embodied as work vehicle electronics 10, where the work vehicle electronics 10 comprises a first sensor 12, a second sensor 14, and a third sensor 16. The sensors (12, 14, and 16) provide sensor data to the assignor 18. In turn, the assignor 18 communicates to a graphical module 20. The graphical module 20 is arranged to communicate performance information to a display 22.

Each sensor (12, 14, 16) collects sensor data on a distinct performance variable or parameter associated with a vehicle, or its implement. For example, each sensor (12, 14, 16) may measure detected levels of a corresponding performance variable at regular time intervals. Each sensor (12, 14, 16) may provide a series or sequence of measurements of sensor data that is updated at time intervals. Each time interval may represent one or more physical samples of the respective sensor (12, 14, or 16).

In one embodiment, the first sensor 12 comprises a ground speed sensor; the second sensor 14 comprises an engine speed sensor; and the third sensor 16 comprises an implement sensor. The ground speed sensor may be realized by a Global Positioning System receiver (e.g., with differential correction), an odometer and a timer, an accelerometer and an integrator, or a speedometer. The engine speed sensor may comprise a tachometer, a magnetic field sensor (e.g., magnetoresistive sensor, Hall Effect sensor, or magnetorestrictive sensor) and a magnet mounted to a shaft, an optical sensor, or another device for measuring a rotational speed of a shaft (e.g., crankshaft or output shaft) of an engine.

The implement sensor may comprise a sensor for measuring an operational parameter of an implement. The operational parameter may comprise a rotational speed of a shaft of an implement, a torque on the shaft of the implement, a load on the implement or a drive motor or engine associated therewith, or another performance metric associated with the operational performance of the implement. For example, if the implement comprises a vacuum for harvesting peat moss or other vegetation or materials, the implement sensor may comprise a vacuum meter or vacuum level sensor.

The assignor 18 assigns positions (e.g., coordinates) of points (e.g., apex points) in image data (e.g., a bitmap) or a graphical data representation, where the respective positions of points are associated with corresponding collected sensor data (e.g., detected levels of performance variables). The assignor 18 may also assign the state (e.g., off, on, active, or inactive) of the points in the image data or a graphical representation. In one embodiment, the positions of the assigned points correspond to pixel coordinates or pixel positions in the image data or graphical data representation. Each pixel may be associated with a corresponding pixel state, where each pixel state may be active, inactive, or may be associated with a particular color, hue, intensity, or brightness value.

In one configuration, the graphical data representation may comprise a grid of possible pixel positions or one or more axes of possible linear pixel positions with known geometric relationships to each other. A known geometric relationship means that axes may be generally orthogonal to each other or parallel to each other. Each axis may be associated with a scale or a possible range of values of performance variables for sensor data of a corresponding sensor (12, 14, 16). Accordingly, the sensor data from a given sensor (12, 14, 16) may be plotted as a point or corresponding pixel on an axis or a grid for a time interval.

The assignor 18 stores or records the value of each sensor datum for at least a time interval in a data storage device (e.g., electronic memory, optical memory, a magnetic disk drive, a hard disk drive, or another storage medium). Further, the assignor 18 may update or revise each sensor datum upon expiration of the time interval or at another regular time.

In one embodiment, the sensor datum for a time interval may be expressed as apex points in an image or graphical data representation. The position and state of each apex point corresponds to a detected level by a corresponding sensor and intercepts an axis or scale. For example, a detected level of a first performance variable may be plotted as a first pixel or pixel cluster with an assigned pixel state (e.g., active or a designated particular color) along a first horizontal axis; a detected level of a second performance variable may be plotted as a second pixel or pixel cluster with an assigned pixel state (e.g., active or a designated particular color) along a first vertical axis; and a third performance variable may be plotted as a third pixel or pixel cluster with an assigned pixel state along a second vertical axis.

The graphical module 20 may comprise one or more of the following components: a data processor for processing image data or a graphical data representation, a data processor for processing the assigned points, a display driver for driving a display, a data storage device, a data management system, and a buffer memory for storing image data or graphical representation data prior to or during display. In one embodiment, a graphical module 20 interconnects the points (e.g., apex points) in the graphical data representation or image data to form a performance polygon (e.g., a triangle or rectangle) indicative of a collective level of performance of the performance variables (e.g., interacting performance variables). The graphical module 20 may interconnect the points (e.g., plotted on axes by the assignor 18) with linear segments that correspond to linear arrays of pixels with assigned pixel states (e.g., active or designed particular color) in a bitmap, image data, or graphical data representation. The graphical module 20 supports updating of the display 22 or the state and/or position of its displayed pixels upon expiration of each time interval.

In one embodiment, the graphical module 20 supports displaying of a performance polygon or geometric shape on the display 22 that indicates whether or not the sensor data is compliant or falls within a normal operational range. Although the graphical module 20 itself may assign, store, retrieve or access a normal reference shape (e.g., reference polygon or reference triangle) for the performance polygon that indicates that the sensor data is compliant or within a normal operational range, in one embodiment an operator, monitor or user of the system may use his or her visual judgment to interpret whether or not the displayed performance polygon (on the display 22) is within a normal operational range. Similarly, although the graphical module 20 itself may assign, store, retrieve, or access a noncompliant reference shape that indicates that one or more sensor datum falls outside of the normal operational range, an operator, monitor or user of the system may use his or her visual judgment to interpret whether or not the displayed performance polygon (on the display 22) is outside the normal operational range. For the foregoing reasons, the difference between the normal reference shape and the noncompliant reference shape should be recognizable, distinguishable, or readily apparent to the average user or most users of the equipment or display 22. Appropriate reference shapes for the normal reference shape, the noncompliant reference shape, or both may be evaluated in surveys of users or by empirical studies to achieve reliable interpretation by the user or operator.

The display 22 may comprise a liquid crystal display (LCD), a light emitting diode display, a plasma display, a cathode ray tube, a color picture tube, or another device for displaying an image.

Figure 2:
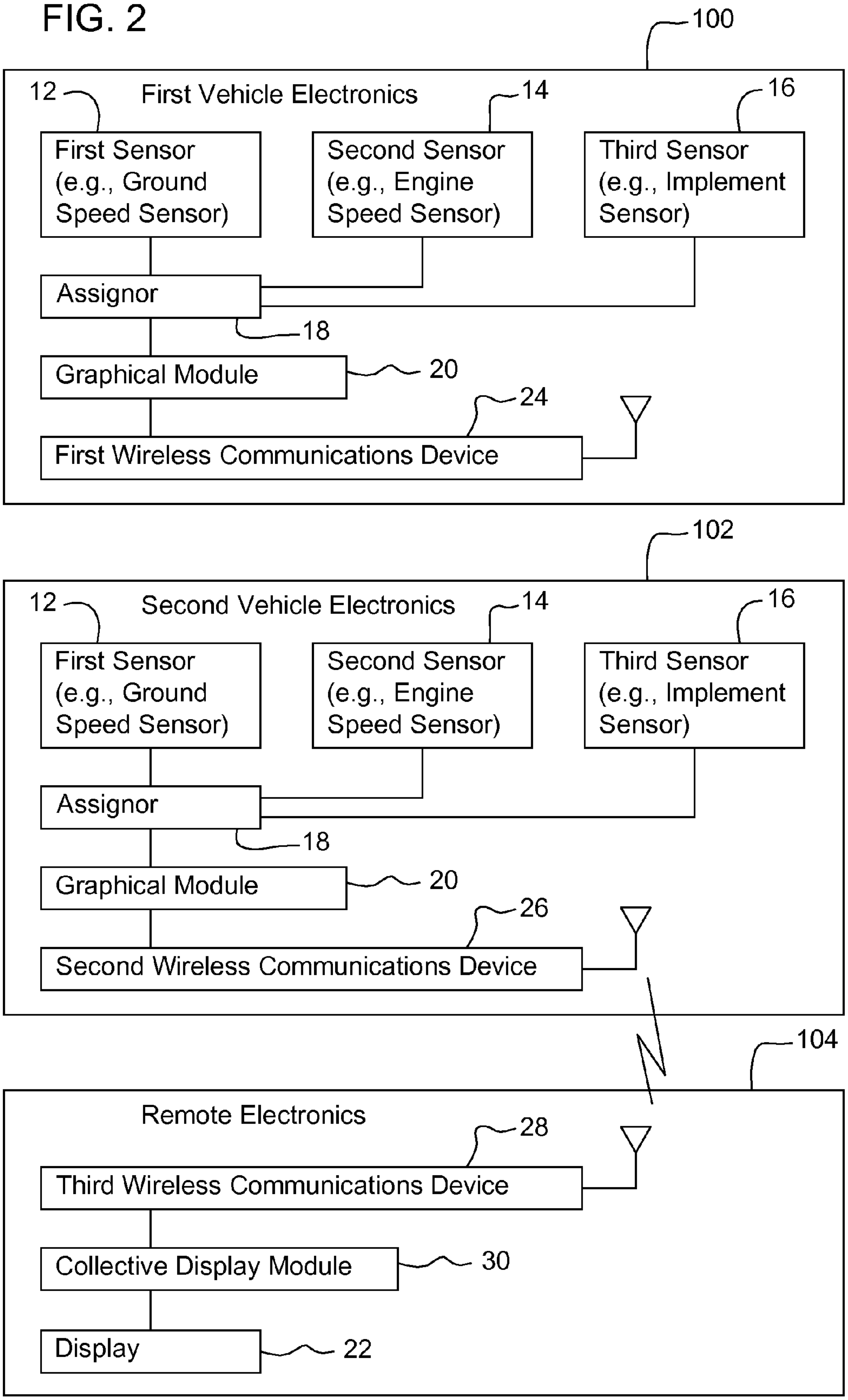
FIG. 2 is a block diagram of a second embodiment of a system for displaying performance information (e.g., interacting performance variables) related to multiple work vehicles.

FIG. 2 illustrates another embodiment of a system for displaying performance variables for multiple vehicles or machines. The system of FIG. 2 comprises first vehicle electronics 100, second vehicle electronics 102, and remote electronics 104.

The first vehicle electronics 100 comprises sensors (12, 14, 16). Each sensor (12, 14, 16) provides sensor data to an assignor 18. In turn, the assignor 18 communicates with a graphical module 20. The graphical module 20 is arranged to communicate with a first wireless communications device 24. In one embodiment, the first sensor 12 comprises a ground speed sensor; the second sensor 14 comprises an engine speed sensor; and the third sensor 16 comprises an implement sensor. For example, the third sensor 16 may comprise a vacuum meter or vacuum sensor, where the implement is a vacuum for harvesting peat moss or harvesting other material.

The second vehicle electronics 102 comprises sensors (12, 14, 16). Each sensor (12, 14, 16) provides sensor data to an assignor 18. In turn, the assignor 18 communicates with a graphical module 20. The graphical module 20 is arranged to communicate with a second wireless communications device 26. In one embodiment, the first sensor 12 comprises a ground speed sensor; the second sensor 14 comprises an engine speed sensor; and the third sensor 16 comprises an implement sensor. For example, the third sensor 16 may comprise a vacuum meter or vacuum sensor, where the implement is a vacuum for harvesting peat moss or other material.

The remote electronics 104 comprises a third wireless communications device 28, which is capable of communicating with the first wireless communications device 24, the second wireless communications device 26, or both via an electromagnetic signal (e.g., a microwave, optical or radio frequency signal). The third wireless communications device 28 is coupled to a collective display module 30. In turn, the collective display module 30 is coupled to a display 22. The display 22 may comprise a liquid crystal display (LCD), a light emitting diode display, a plasma display or any other display for displaying one or more images is graphical representations of the performance of one or more vehicles or machines.

The first wireless communications device 24, the second wireless communications device 26, and the third wireless communications device 28 may communicate over one or more communication channels. Different channels may be associated with different frequencies of electromagnetic signals transmitted or received, different time slots assigned to such transmissions, or different codes assigned to such transmissions, among other things. In one configuration, the third wireless communications device 28 may act as a master station that interrogates or polls the first wireless communications device 24 and the second wireless communications device 26 for information on a regular (e.g., periodic basis). In another configuration, the first wireless communications device 24 and the second wireless communications device 26 may transmit information to the third wireless communications device 28 upon receipt of the information, upon accumulation of a certain amount of information (e.g., achieving a minimum file size or buffer memory threshold size) or at a particular time or over a group of particular time slots (e.g., assigned time slots).

The collective display module 30 may be arranged to assign a graphical output of first vehicle electronics 100 to a first window within a displayed image or frame and to assign a graphical output of the second vehicle electronics to a second window within a displayed image or frame.

In an alternate embodiment, a first location-determining receiver is coupled to the first wireless communications device 24 and a second location determining receiver is coupled to a second wireless communications device 26. The first location-determining receiver (e.g., Global Positioning System receiver) may provide location data (e.g., coordinates) associated with the first vehicle electronics 100 (or the first vehicle) to the remote electronics 104 via the first wireless communications device 24 and the third wireless communications device 28. The second location-determining receiver (e.g., Global Positioning System receiver) may provide location data (e.g., coordinates) associated with the second vehicle electronics 102 (or the second vehicle) to the remote electronics 104 via the second wireless communications device 26 and the third wireless communications device 28. The collective display module 30 is arranged to display a relative position of a first vehicle or the first location-determining receiver to that of the second vehicle or the second location-determining receiver on the display 22.

Figure 3:
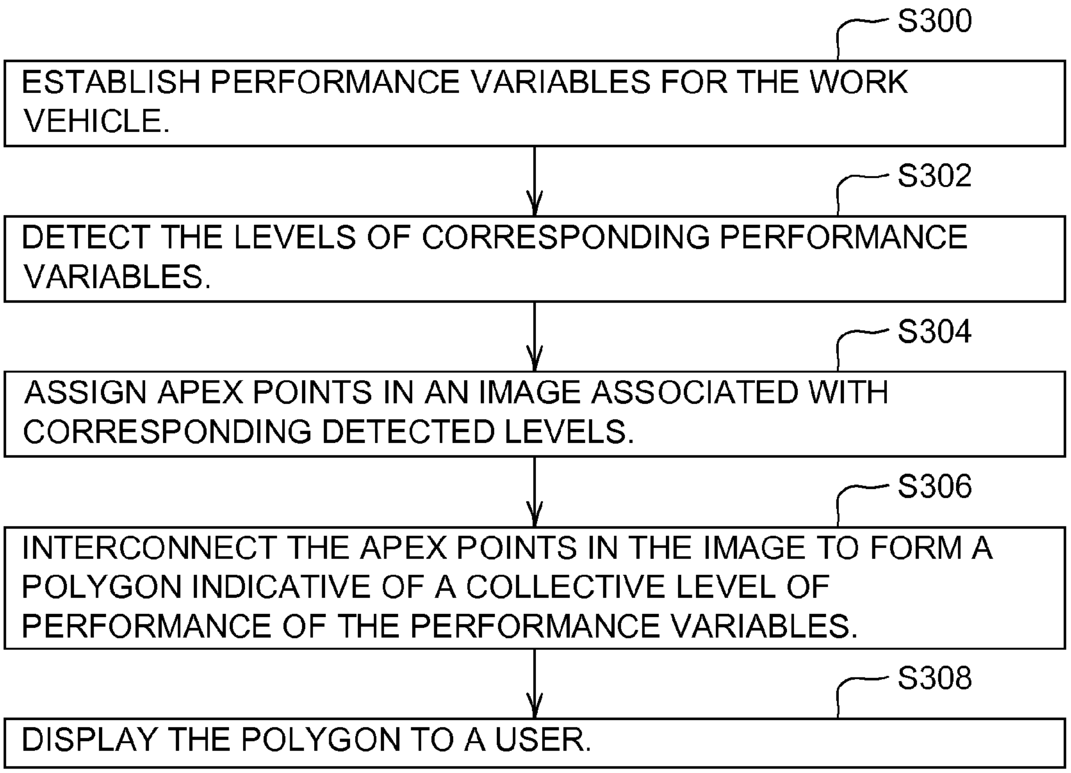
FIG. 3 is a flow chart of a method for displaying performance information related to a work vehicle.

FIG. 3 is a method for displaying performance of one or more vehicles. The method of FIG. 3 begins in step S300.

In step S300, work vehicle electronics (10, 100 or 102), an assignor 18, or both establishes performance variables (e.g., interacting variables) for a vehicle. The work vehicle electronics (10, 100 or 102) may be programmed, configured or designed to collect performance information about particular performance variables (e.g., interacting variables). The performance variables to be tracked are supported by corresponding sensors. In one embodiment, the work vehicle electronics (10, 100 or 102) supports the tracking of a group of the following performance variables: ground speed of the work vehicle, engine speed of the work vehicle, an operational parameter of an implement, a rotational speed of a shaft of an implement, a torque on the shaft of the implement, a load on the implement or a drive motor or engine associated therewith, or another performance metric associated with the operational performance of the implement or the work vehicle.

In step S302, sensors (12, 14, 16) detect the levels of corresponding performance variables. For example, the first sensor 12 senses a first performance variable (e.g., ground speed); the second sensor 14 senses a second performance variable (e.g., an engine speed); and the third sensor 16 senses a third performance variable (e.g., an implement status sensor or vacuum level).

In step S304, an assignor 18 assigns points (e.g., apex points) in image data or graphical data representation associated with corresponding detected levels. For example, a detected level of a first performance variable may be plotted as a first pixel position or cluster with a designated pixel state along a first horizontal axis; a detected level of a second performance variable may be plotted as a second pixel position or cluster with a designated pixel state along a first vertical axis, and a third performance variable may be plotted as a third pixel position or cluster with a designated pixel state along a second vertical axis. The designated pixel state may comprise an active state or an inactive state for a monochrome display or a certain color or hue for a color display.

In step S306, the graphical module 20 or assignor 18 interconnects the assigned points (e.g., apex points) in the image data or graphical data representation to form a performance polygon indicative of a collective level of performance of the performance variables. For example, the graphical module 20 may connect the assigned points with linear segments (e.g., pixel arrays) of pixels of substantially equivalent pixels states to the designated pixel states of the assigned points. Further, the graphical module 20 may assign the designated pixel states to the interior region of pixels bounded by the performance polygon or the linear segments to form the performance polygon.

In step S308, the display 22, the graphical module 20, or both display 22 the performance polygon to a user. The performance polygon may have a generally uniform hue or color, consistent with the designated pixel state. The shape of the polygon (e.g., triangle) may indicate whether the variables or detected levels are operating within a desired range. The user may adjust the vehicle or controls of the vehicle, the implement, or both to achieve a target shape or desired shape of the performance polygon, which indicates proper operation (e.g., preferential or optimum performance) of the vehicle, its implement, or both. Alternatively, the vehicle electronics (10, 100, 102) may report nonconformity of the performance polygon with a normal reference polygon to generate a status message to a vehicular control system.

Step S308 may be executed in accordance with various techniques that may be applied alternatively or cumulatively.

Under a first technique for carrying out step S308, the graphical module 20 supports displaying of an observed performance polygon or geometric shape on the display 22 that indicates whether or not the sensor data is compliant or falls within a normal operational range. An operator, monitor or user of the vehicle electronics may use his or her visual judgment to interpret whether or not the observed performance polygon (e.g., the displayed performance polygon on the display 22) is within a normal operational range. A normal reference shape or reference polygon may be stored in a data storage device associated with the vehicle electronics. In one configuration, the reference polygon or normal reference shape is projected on the display for comparison (e.g., side-by-side or overlaying the images) to the observed performance polygon. Any material differences between a normal reference shape and the observed (e.g., displayed) performance polygon that indicate noncompliance of one or more performance variables should be recognizable, distinguishable, or readily apparent on a reliable basis to the users of the equipment or display 22.

Under a second technique, an operator, monitor or user of the system may use his or her visual judgment to interpret whether or not the observed performance polygon (e.g., the displayed polygon on the display 22) is outside the normal operational range. A noncompliant reference shape or noncompliant reference polygon may be stored in a data storage device associated with the vehicle electronics. In one configuration, the noncompliant reference shape or noncompliant reference polygon is projected on the display (e.g., side-by-side or overlaying the images) for comparison to the observed performance polygon. Substantial similarity between a noncompliant reference shape and the observed performance polygon should be recognizable, distinguishable, or readily apparent on a reliable basis to a user of the equipment or display 22.

Under a third technique, the graphical module 20 may assign, store, retrieve or access a normal reference shape (e.g., reference polygon or reference triangle) for the observed performance polygon to assess whether or not the sensor data is compliant or within a normal operational range. A normal reference shape or reference polygon may be stored in a data storage device associated with the vehicle electronics. The graphical module 20 or a detector in the vehicle electronics detects a material difference between the normal reference shape and the observed performance polygon that indicates noncompliance of one or more performance variables and generates an alarm (e.g., visual alarm or audible alarm) for the display and/or an alarm status signal. For example, if the alarm is a visual alarm, the visual alarm may comprise flashing or a blinking display, a change in intensity of the display versus time, or another display reasonably calculated to attract the attention of a user.

Under a fourth technique, the graphical module 20 may assign, store, retrieve or access a noncompliant reference shape (e.g., a noncompliant reference polygon or noncompliant reference triangle) for the performance polygon that indicates whether or not the sensor data is compliant or within a normal operational range. A noncompliant reference shape or noncompliant reference polygon may be stored in a data storage device associated with the vehicle electronics. The graphical module 20 or a detector of the vehicle electronics detects substantial similarities between a noncompliant reference shape and the observed (e.g., displayed) performance polygon that indicate noncompliance of one or more performance variables and generates an alarm (e.g., visual alarm or audible alarm) for the display and/or an alarm status signal. For example, if the alarm is a visual alarm, the visual alarm may comprise flashing or a blinking display, a change in intensity of the display versus time, or another display reasonably calculated to attract the attention of a user.

Under a fifth technique, work vehicle electronics (10, 100, 102) or the assignor 18 and graphical module 20 establish a reference polygon, where the performance variables comprise three performance variables and wherein the performance polygon has a generally triangular shape. For example, the performance polygon comprises a performance triangle. The assignor 18 may retrieve points or the image of the reference polygon from a data storage device, for example. The graphical module 20 or the vehicle electronics generates an alarm if a shape of the performance polygon (e.g., generally triangular performance polygon) materially deviates from that of the reference polygon (e.g., a reference triangular polygon) or if the angles of the observed performance triangle deviate materially from those of a reference triangular polygon (or triangular shape). Material deviation means any of the following: (1) that the ratio of two or more lengths of the sides of the performance triangle violate a minimum or maximum ratio, (2) one or more angles between the sides of the performance triangle meets or exceeds a maximum angle, (3) one or more angles between the sides of the performance triangle is equal to or less than a minimum angle, (4) the performance triangle meets certain definitions defined by one or more trigonometric functions (e.g., sine, cosine or tangent functions).

Under a sixth technique, work vehicle electronics (10, 100, 102) or the assignor 18 and graphical module 20 establish a reference polygon, where the performance variables comprise four performance variables and where the performance polygon has a generally rectangular shape, a generally trapezoidal shape, or a trapezium-like shape. A trapezoid is quadrilateral figure with two parallel sides, whereas a trapezium is a quadrilateral figure with no parallel sides. The assignor 18 may retrieve points or the image of the reference polygon from a data storage device, for example. The graphical module 20 or the vehicle electronics generates an alarm if a shape of the performance polygon (e.g., generally rectangular performance polygon) materially deviates from that of the reference polygon (e.g., a reference rectangular polygon) or if the angles of the observed performance polygon deviate materially from those of a reference polygon. Material deviation means any of the following: (1) that the ratio of two or more lengths of the sides of the polygon violate a minimum or maximum ratio, (2) one or more angles between the sides of the performance polygon meets or exceeds a maximum angle, (3) one or more angles between the sides of the performance polygon is equal to or less than a minimum angle, (4) the performance meets certain definitions defined by one or more trigonometric functions (e.g., sine, cosine or tangent functions).

Figure 4:
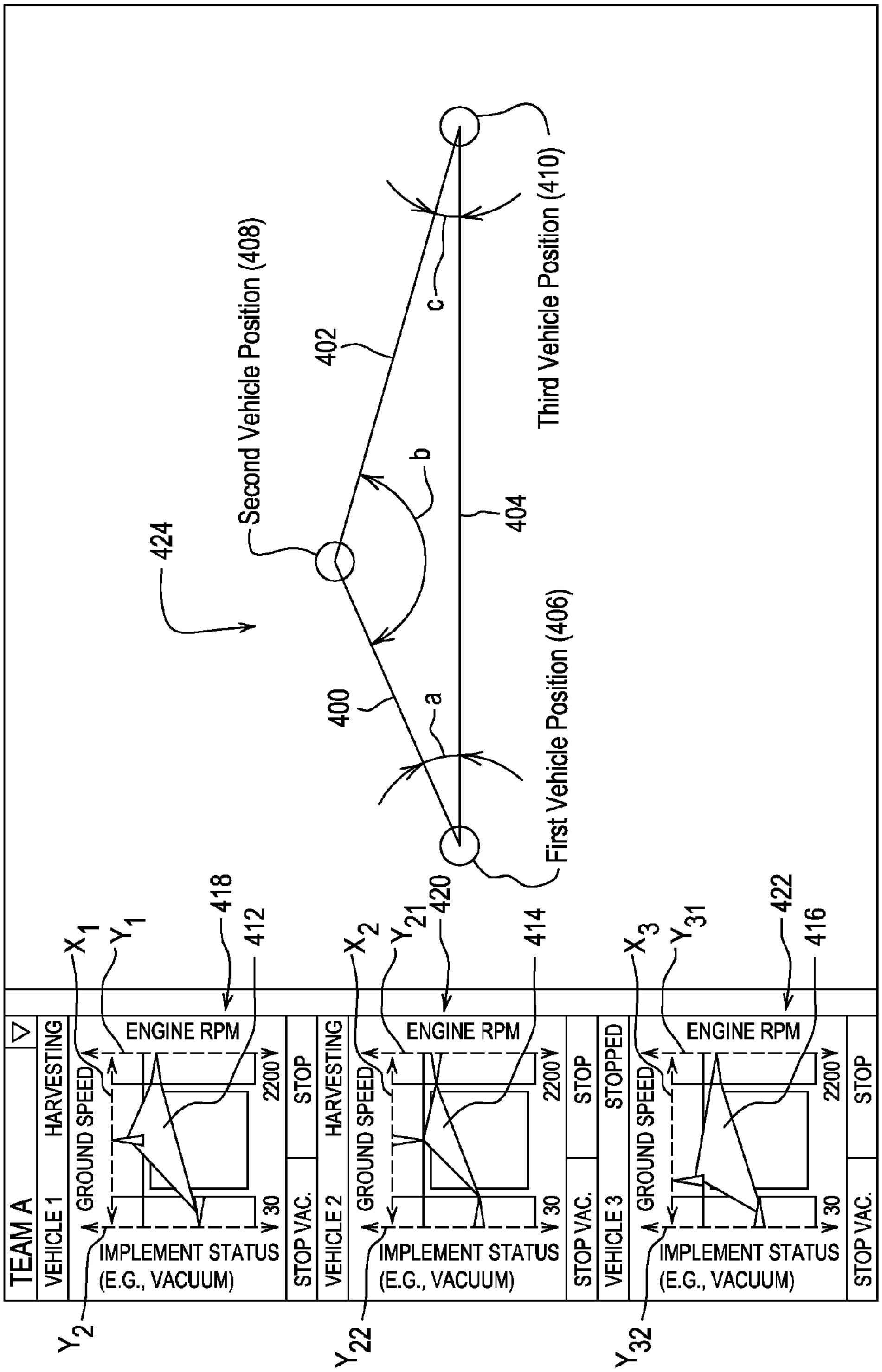
FIG. 4 is an illustrative graphical representation of displayed information relating to the performance of one or more work vehicles.

FIG. 4 shows an illustrative graphical representation of multiple performance polygons (412, 414, 416), where each performance polygon is associated with the performance of a corresponding vehicle or machine. A first performance polygon 412 of a first vehicle is shown in an upper left window 418; a second performance polygon 414 of a second vehicle is shown in the middle left window 420; and a third performance polygon 416 of a third vehicle is shown in the lower left window 422. In the right-most window 424, the relative position of three vehicles is shown.

Each graphical representation or window has a horizontal axis and two vertical axes. The upper left window 418 has a horizontal axis $X_1$ and two vertical axes ($Y_1$, $Y_2$). The middle left window 420 has a horizontal axis $X_2$ and two vertical axes ($Y_{21}$, $Y_{22}$). The lower left window 422 has a horizontal axis $X_3$ and two vertical axes ($Y_{31}$, $Y_{32}$). Here in FIG. 4, each horizontal axis ($X_1$, $X_2$, $X_3$) indicates ground speed of the vehicle, each first vertical axis ($Y_1$, $Y_{21}$, $Y_{31}$) indicates engine speed (e.g., in revolutions per unit time (RPM)). Each second vertical axis ($Y_2$, $Y_{22}$, $Y_{32}$) indicates implement status (e.g., vacuum level for peat moss harvesting).

The operator may adjust the ground speed, the engine speed, or the vacuum level to produce a performance polygon (e.g., performance triangle) of a desired or target shape (e.g., a target performance triangle). For example, the target performance polygon may be shaped as an equilateral triangle, an isosceles triangle, or another configuration where the triangle is defined by the relative lengths of its sides, the angles between its sides, or as one or more trigonometric or geographic functions. Although the apex points of the performance polygon in FIG. 4 are offset by an offset distance perpendicular to each axis, it is understood that in an alternate embodiment the apex points may lie directly on each axis and may fall within the scope of one or more claims.

In one configuration, the color of the performance polygon may change based on its level of compliance or conformance to a target performance polygon. For example, if all performance parameters or performance variables are fully compliant, the polygon may be displayed as a generally green polygon, whereas if certain performance parameters are not fully compliant, the polygon may be displayed as a generally red or generally yellow performance polygon.

Although the performance polygon of FIG. 4 is illustrated as a triangle, the performance polygon may be characterized as a square or rectangle in an alternative embodiment. In such case, four sensors would be used and an additional horizontal axis would be used to plot the performance level of the fourth sensor.

Referring to the rightmost window 424, the relative positions of three vehicles is indicated. The underlying position data for each of the vehicles may be provided by a location-determining receiver (e.g., Global Positioning Receiver) mounted on each vehicle, where a wireless device on each vehicle (e.g., 24, 26) transmits a wireless signal to remote electronics (e.g., remote electronics 104 of FIG. 2) for processing by a collective display module (e.g., 30) and for displaying on a display (e.g., 22). The remote electronics 104 or collective display module 104 may facilitate displaying of multiple windows in FIG. 4 and the displaying of the relative positions of the vehicle in the rightmost window 424.

In FIG. 4, the first vehicle is at a first vehicle position 406; the second vehicle is at a second vehicle position 408; and the third vehicle is at a third vehicle position 410. Each vehicle is separated from the other vehicles by two line segments, which may vary in length as the relative position of the vehicles change over time. Similarly, each vehicle has an angle associated with the two line segments that define its position relative to the other vehicles. The first vehicle is separated from the second vehicle by a first line segment 400 and from the third vehicle by a third line segment 404. The first line segment 400 intersects the third line segment 404 at angle a. The second vehicle is separated from the first vehicle by a first line segment 400 and from the third vehicle by a second line segment 402. The first line segment 400 intersects the second line segment 402 at angle b. The third vehicle is separated from the second vehicle by a second line segment 402 and from the third vehicle by a third line segment 404. The second line segment 402 intersects the third line segment 404 at angle c.

The vehicular electronics or graphical module 20 may be arranged to generate an alarm if the distances (line segments 400, 402, 404) between the vehicles becomes too short or if the angles (a, b, c) exceed certain predefined angular limits, or both. For example, each line segment may have a minimum threshold length; if the actual or detected line segment length is equal to or less than the minimum threshold length, an alarm or a control signal (e.g., collision preventative signal) is generated.

The predefined angular limits may comprise a lower limit, an upper limit, or an angular range in which the probability of the collision exceeds a threshold probability. The predefined angular limits may vary, but need not vary, based on the velocity, heading, or both of each vehicle. The lower limit represents a permitted minimum angle based on maintaining safe spatial separation between two or more vehicles operating in a group of three or more vehicles, whereas the upper limit represents a maximum permitted angle based on maintaining a safe spatial separation between two or more vehicles operating in a group of three or more vehicles.

Figure 5:
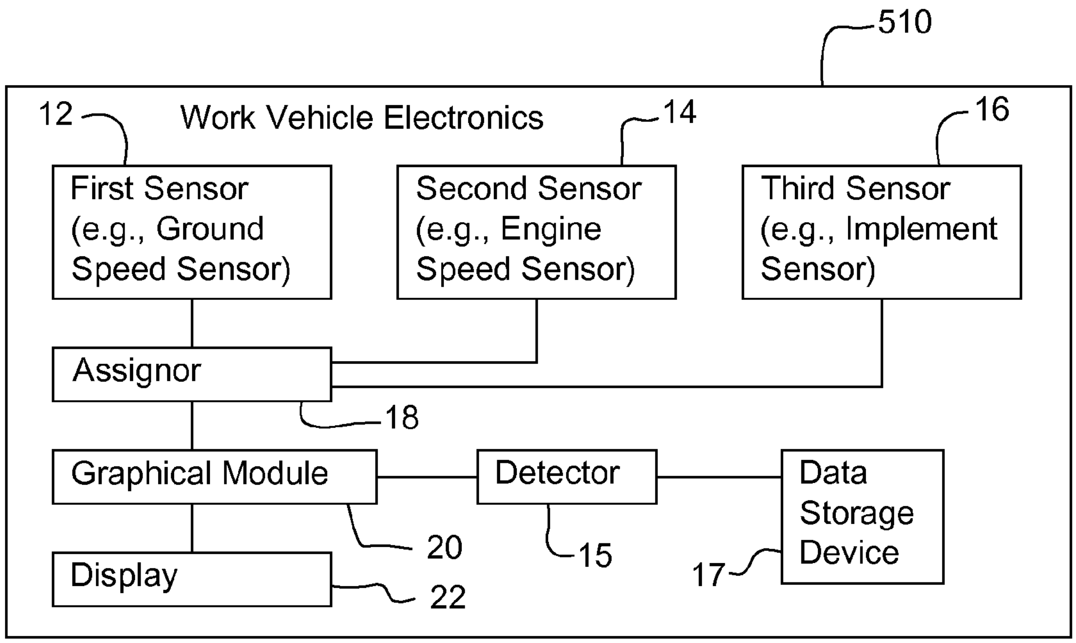
FIG. 5 is a block diagram of a third embodiment of a system for displaying performance information related to multiple work vehicles.

The work vehicle electronics 510 of FIG. 5 are similar to the work vehicle electronics 10 of FIG. 1, except the work vehicle electronics 510 of FIG. 5 further comprises a detector 15 and a data storage device 17. The data storage device 17 stores reference data, such as a reference polygon, a reference triangle, a reference trapezoid, a reference trapezium, a noncompliant polygon, a noncompliant triangle, a normal reference shape, and a noncompliant reference shape, side ratios for reference triangles, minimum angles for reference triangles, maximum angles for reference triangles, reference trigonometric expressions, and the like. The detector 15 may access the reference data for comparison to an observed performance polygon to determine whether the observed performance polygon is generally noncompliant or compliant with target values of the performance variables (e.g., interacting variables).

In one embodiment, the detector 15 comprises a detector limit detector that detects whether (1) a sensor datum or sensor data for a sensor (12, 14, 16) meets or exceeds a limit value (e.g., upper limit threshold) for one or more time intervals to trigger an alarm (e.g., a visual alarm), or (2) a sensor datum or sensor data for a sensor (12, 14, 16) falls below a limit value (e.g., lower limit threshold) for one or more time intervals to trigger an alarm (e.g., visual alarm) or generate an alarm signal. The alarm may comprise a visual, aural, or other alarm to alert the user. The alarm may be displayed on the display 22 as pixels of different hue or color (e.g., red pixels or pixels within the red range of humanly visible light) than ordinarily are displayed when the sensor data is within normal operational ranges. For instance, pixels may ordinarily be displayed as green pixels when the sensor data falls within a normal operational range and red pixels when the sensor data falls outside of a normal operational range.

In another embodiment, the detector 15 retrieves or accesses a normal reference shape (e.g., reference polygon or reference triangle) for the observed performance polygon from the data storage device 17 to assess whether or not the sensor data is compliant or within a normal operational range. A normal reference shape or reference polygon may be stored in the data storage device 17 associated with the vehicle electronics 510. The graphical module 20 or a detector 15 in the vehicle electronics detects a material difference between the normal reference shape and the observed performance polygon that indicates noncompliance of one or more performance variables and generates an alarm (e.g., visual alarm or audible alarm) for the display 22 and/or an alarm status signal. For example, if the alarm is a visual alarm, the visual alarm may comprise flashing or a blinking display, a change in intensity of the display versus time, or another display reasonably calculated to attract the attention of a user.

In yet another embodiment, the detector 15 retrieves or accesses a noncompliant reference shape (e.g., a noncompliant reference polygon or noncompliant reference triangle) for the performance polygon that indicates whether or not the sensor data is compliant or within a normal operational range. A noncompliant reference shape or noncompliant reference polygon may be stored in the data storage device 17 associated with the vehicle electronics 510. The graphical module 20 or a detector 15 of the work vehicle electronics 510 detects substantial similarities between a noncompliant reference shape and the observed (e.g., displayed) performance polygon that indicate noncompliance of one or more performance variables and generates an alarm (e.g., visual alarm or audible alarm) for the display 22 and/or an alarm status signal. For example, if the alarm is a visual alarm, the visual alarm may comprise flashing or a blinking display, a change in intensity of the display versus time, or another display reasonably calculated to attract the attention of a user.

Having described the preferred embodiment, it will become apparent that various modifications can be made without departing from the scope of the invention as defined in the accompanying claims.

The following is claimed:

1. A method for displaying actual performance information of a work vehicle on a display device, the method comprising:

establishing performance variables associated with the work vehicle;

detecting corresponding levels of the established performance variables;

assigning points in image data or a graphical data representation associated with the detected corresponding levels;

interconnecting the points in the image to form a performance polygon indicative of a collective level of performance of the performance variables; and displaying the performance polygon on the display device in real time such that the performance polygon dynamically changes in shape based upon the detected corresponding levels of the established performance variables at a given point in time, wherein the displaying comprises displaying at least two performance polygons on the display device, with each respective performance polygon being related to a different work vehicle; and displaying a relative position of each associated work vehicle with respect to one another concurrently with the displaying of the at least two performance polygons.

2. The method according to claim 1 wherein the performance variables comprise three or more of the following: revolutions per unit time of a shaft, revolutions per unit time of a motor shaft, revolutions per unit time of a crankshaft, revolutions per unit time of a drive shaft, ground speed of the work vehicle, engine speed of the work vehicle, an operational parameter of an implement, a rotational speed of a shaft of an implement, a torque on the shaft of the implement, a load on the implement or a drive motor or engine associated therewith, and vacuum level of an implement.

3. The method according to claim 1 further comprising:

establishing a reference polygon; and generating an alarm if a shape of the performance polygon deviates from that of the reference polygon.

4. The method according to claim 1 where there are at least three work vehicles, and the relative position is displayed as a polygon.

5. The method according to claim 4 wherein an alarm is generated if either a polygon line segment between a representation of two of the at least three work vehicles is less than a distance threshold or an angle of the polygon exceeds an angular threshold.

6. The method according to claim 1 wherein the interconnecting further comprises:

interconnecting the assigned points with linear segments of pixels of substantially equivalent pixels states to designated pixel states of the assigned points.

7. The method according to claim 6 wherein the interconnecting further comprises: assigning the designated pixel states to an interior region of pixels bounded by the performance polygon or by the linear segments that form the performance polygon.

8. A method for displaying actual performance information of a work vehicle on a display device, the method comprising:

establishing performance variables associated with the work vehicle;

detecting corresponding levels of the established performance variables;

assigning points in image data or a graphical data representation associated with the detected corresponding levels;

interconnecting the points in the image to form a performance polygon indicative of a collective level of performance of the performance variables; and displaying the performance polygon on the display device in real time such that the performance polygon dynamically changes in shape based upon the detected corresponding levels of the established performance variables at a given point in time, wherein the assigning further comprises:

plotting a detected level of a first performance variable as a first pixel or pixel cluster with an assigned pixel state along a first horizontal axis;

plotting a detected level of a second performance variable may be plotted as a second pixel or pixel cluster with an assigned pixel state along a first vertical axis; and plotting a third performance variable may be plotted as a third pixel or pixel cluster with an assigned pixel state along a second vertical axis that is parallel to the first vertical axis.

9. A system for displaying performance information related to multiple vehicles, the system comprising:

a plurality of first sensors for detecting levels associated with corresponding performance variables of a first vehicle;

a first assignor for assigning points in an image associated with corresponding detected levels of the first vehicle;

a first graphical module for interconnecting the points in the image to form a first performance polygon indicative of a collective level of performance of the performance variables of the first vehicle;

a first wireless communications device for transmitting image data associated with the image of the first performance polygon;

a plurality of second sensors for detecting levels associated with corresponding performance variables of a second vehicle;

a second assignor for assigning points in an image associated with corresponding detected levels of the second vehicle;

a second graphical module for interconnecting the points in the image to form a second performance polygon indicative of a collective level of performance of the performance variables of the second vehicle;

a second wireless communications device for transmitting image data associated with the image of the second performance polygon;

a third wireless communications device for receiving the image data; and a display displaying the received image data, including the first performance polygon and the second performance polygon, to a user.

10. The system according to claim 9 wherein the performance variables comprise one or more of the following: revolutions per unit time of a shaft, revolutions per unit time of a motor shaft, revolutions per unit time of a crankshaft, revolutions per unit time of a drive shaft, ground speed of the work vehicle, engine speed of the work vehicle, an operational parameter of an implement, a rotational speed of a shaft of an implement, a torque on the shaft of the implement, a load on the implement or a drive motor or engine associated therewith, and vacuum level of an implement.

11. The system according to claim 9 further comprising:

a data storage device for storing a reference polygon; and a detector for generating an alarm signal if a shape of at least one of the first performance polygon and the second performance polygon deviates from that of the reference polygon.

12. The system according to claim 9 wherein the displaying step comprises displaying at least two performance polygons on the display device, with each respective performance polygon being related to a different work vehicle, and wherein the performance variables comprise three interacting performance variables that interact with one another.

13. The system according to claim 12, wherein the performance polygon has a generally triangular shape, and further comprising:

a data storage device for storing a reference triangle;

a detector for generating an alarm signal if the angles of the triangle shape deviate materially from those of the reference triangle.

14. The system according to claim 12 where there are at least three work vehicles, and the relative position is displayed as a polygon.

* * * * *